Oct. 6, 1925.  1,556,209
P. D'H. DRESSLER
METHOD OF AND MEANS FOR HANDLING MATERIAL IN ANNEALING
Filed Sept. 21, 1923
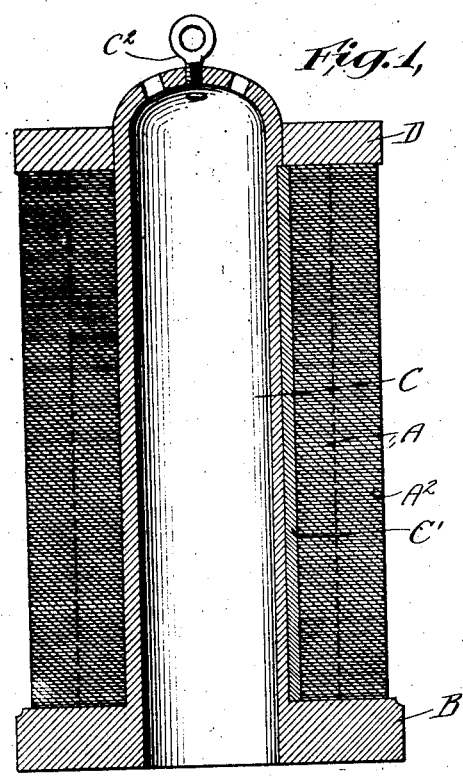
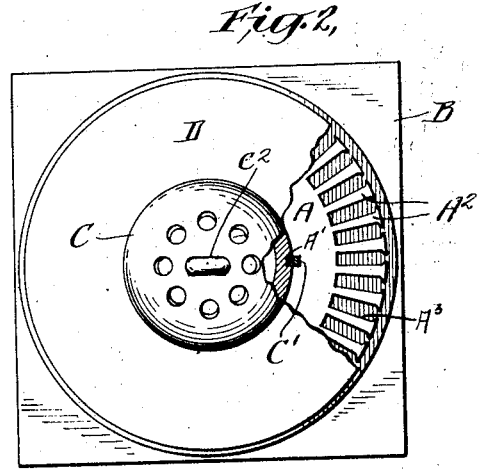
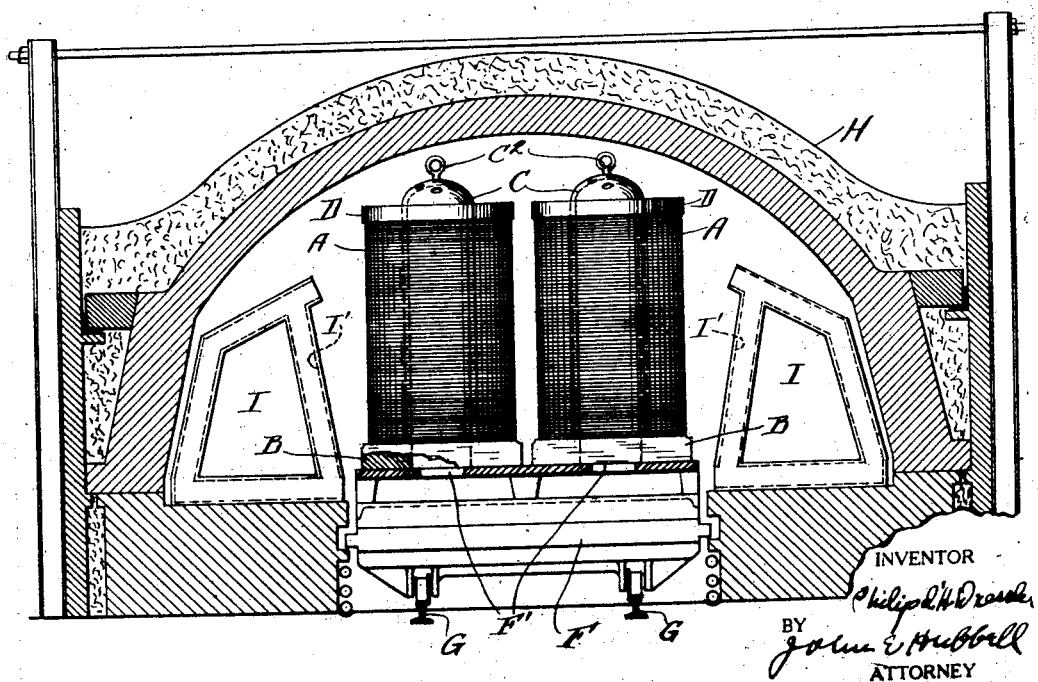
INVENTOR
BY
ATTORNEY Patented Oct. 6, 1925.

1,556,209

UNITED STATES PATENT OFFICE.

PHILIP D'HUC DRESSLER, OF CLEVELAND, OHIO, ASSIGNOR TO AMERICAN DRESSLER TUNNEL KILNS, INC., OF CLEVELAND, OHIO, A CORPORATION OF NEW YORK.

METHOD OF AND MEANS FOR HANDLING MATERIAL IN ANNEALING.

Application filed September 21, 1923. Serial No. 663,949.

*To all whom it may concern:*

Be it known that I, PHILIP D'HUC DRESSLER, a subject of the King of Great Britain, and resident of Cleveland, in the county of Cuyahoga and State of Ohio, have invented certain new and useful Improvements in Methods of and Means for Handling Material in Annealing, of which the following is a specification.

The general object of my present invention is to provide an improved method of, and improved means for handling small bodies of sheet metal such as armature punchings and protecting them against mechanical injury and surface oxidation while the bodies are being annealed or subjected to other heat treatment tending to produce undesirable surface oxidation.

The manner in which the general object of my invention is attained is made apparent in the accompanying drawings and the following descriptive matter wherein I have illustrated and described a preferred form of apparatus specially devised for handling armature punchings in accordance with the present invention although capable of use for other purposes.

Of the drawings:

Fig. 1 is a sectional elevation of apparatus for holding and protecting a stack of a... a- ture punchings;

Fig. 2 is a plan view partly broken away and in section of the apparatus shown in Fig. 1; and Fig. 3 is a transverse section through a tunnel kiln in which the apparatus of Figs. 1 and 2 is employed.

In accordance with the present invention armature punchings A or analogous sheet metal bodies are assembled in a horizontally laminated stack on a support B provided with an uprising post C about which the sheet metal bodies are stacked. When as in the case of the armature punchings shown, the sheet metal bodies are of annular form, the support B may be made circular, with the post C rising from the center of the support and shaped to suit the openings in the bodies A. As shown, the post C is provided with a rib C' entering the key slots A' in the armature punchings A, whereby the peripheral teeth A² and slots A³ of the punchings are held in register. Mounted on the stack of bodies A is a follower weight D, shown as provided with a central opening receiving the upper end of the post C which projects therethrough and is provided above the follower with an eye C² or analogous provisions for ready attachment to a crane hook or other instrument for lifting and transporting the support A and its load.

With the described construction, the stack of sheet metal bodies A mounted on a support B may be readily and safely transported in units or masses of convenient size. When the stack of sheet metal bodies thus assembled and supported is subjected to an annealing or other heat treatment, the flat sides of the bodies A are well protected against surface oxidation since the compression of the stack between the support B and weight D prevents the oxygen of the air from coming into contact with the flat sides of the bodies in amount sufficient to produce substantial oxidation. The invention is of particular advantage in handling armature or other sheet metal punchings, since it is readily feasible to assemble the punchings or analogous bodies on the supports as they are punched out by the punching machine. The use of the invention makes it unnecessary to pack punchings or analogous material in boxes for annealing or analogous heat treatment While my invention is not restricted to use in connection with any particular type of annealing or other furnace it is especially advantageous when used in annealing the bodies in a tunnel kiln through which the bodies heated are passed on cars, as in the construction shown in Fig. 3, wherein F represents a kiln car running on track rails G in a tunnel kiln H. The particular kiln shown is the Dressler type, in which heat is supplied to the kiln chamber by the combustion of fluid fuel in combustion chambers I running longitudinally of the kiln chamber, and formed with channels I' in their walls through which a convection current circulation of the kiln atmosphere is induced in the manner characteristic of the Dressler kilns. In such a use of the invention, the posts C of the work supports may be made hollow, and open at their lower ends to permit the entrance of the kiln atmosphere, the hollow interiors of the posts C being in register with openings F' communicating with channels provided for the circulation of the kiln atmosphere in the work supporting platform of the car. The posts C may also be open at their upper ends to increase the circulation of the kiln's atmosphere therethrough, but this is not ordinarily necessary.

While in accordance with the provisions of the statutes I have illustrated and described a preferred embodiment of my invention it will be apparent to those skilled in the art that formal changes may be made in the apparatus and mode of operation disclosed, without departing from the spirit of my invention as set forth in the appended claims.

Having now described my invention, what I claim as new and desire to secure by Letters Patent is:

1. In subjecting bodies of sheet metal to heat treatment, the improvement which consists in piling the bodies in a horizontally laminated stack on a support provided with an uprising post about which the bodies are stacked and by which the support and stack may be lifted and capping the stack with a weight whereby the stack is compressed and the flat sides of the bodies are substantially protected against the action of the heated atmosphere to which they are subjected.

2. Means for supporting and transporting sheet metal bodies comprising a support on which the bodies may be piled in a horizontally laminated stack and which is provided with an uprising post about which the bodies are stacked and which has provisions at its upper end for a detachable connection to means for lifting said support and a weight forming a cap for the stack of bodies on said support.

3. The combination with an annealing kiln car, of work supports removably mounted on said car and each comprising a support on which material to be annealed is stacked, and a post about which the material is stacked, said post being secured at its lower end to said support and having provisions at its upper end for detachable connection to means for lifting said support.

4. The combination with an annealing kiln car formed with channels for the circulation of the kiln atmosphere in the work supporting platform of the car, of work supports removably mounted on said car and each consisting of a support on which material to be annealed is stacked and a post about which the material is stacked, said posts having hollow interiors connecting at their lower ends with said channels and each having provisions at its upper end for detachable connection to means for lifting the supports.

Signed at Cleveland, in the county of Cuyahoga and State of Ohio this 17th day of September A. D. 1923.

PHILIP D'HUC DRESSLER.